(12) United States Patent
Sinha

(10) Patent No.: US 6,738,839 B2
(45) Date of Patent: May 18, 2004

(54) METHOD AND SYSTEM FOR ALLOCATING LOGICAL PATHS BETWEEN A HOST AND A CONTROLLER IN A VIRTUAL DATA STORAGE SYSTEM

(75) Inventor: Amar Nath Sinha, Arvada, CO (US)

(73) Assignee: Storage Technology Corporation, Louisville, CO (US)

( * ) Notice: Subject to any disclaimer, the term of this patent is extended or adjusted under 35 U.S.C. 154(b) by 215 days.

(21) Appl. No.: 10/027,213

(22) Filed: Dec. 27, 2001

(65) Prior Publication Data

US 2003/0126321 A1 Jul. 3, 2003

(51) Int. Cl.[7] .................................................. G06F 3/00
(52) U.S. Cl. .......................... 710/39; 710/31; 710/38; 710/131; 711/6; 711/114; 711/147; 711/156; 711/162; 709/105
(58) Field of Search .............................. 710/38, 39, 31, 710/131; 711/147, 6, 114, 156, 162; 709/105

(56) References Cited

U.S. PATENT DOCUMENTS 6,145,028 A * 11/2000 Shank et al. .................. 710/31
6,185,601 B1 * 2/2001 Wolff ........................... 709/203
6,434,637 B1 * 8/2002 D'Errico ...................... 710/38
6,654,831 B1 * 11/2003 Otterness et al. ............. 710/74

* cited by examiner

Primary Examiner—Jeffrey Gaffin
Assistant Examiner—Niketa Patel
(74) Attorney, Agent, or Firm—Brooks Kushman P.C.

(57) ABSTRACT

A method and system for allocating logical paths between a host and a controller in a virtual data storage system such that the loads on the logical paths from storage devices are distributed evenly across the logical paths. When a connection request for connecting a storage device to the host is received by the controller, the controller counts an amount of queued connection requests from the storage devices to the host on each logical path. A logical path for the new connection request is then selected as a function of the amount of queued connection requests on each logical path and the current input/output activity on each logical path. The controller selects the logical path void of current input/output activity that has the lowest amount of queued connection requests to be the selected logical path. The controller then associates the new connection request with the selected logical path.

12 Claims, 2 Drawing Sheets

METHOD AND SYSTEM FOR ALLOCATING LOGICAL PATHS BETWEEN A HOST AND A CONTROLLER IN A VIRTUAL DATA STORAGE SYSTEM

BACKGROUND OF THE INVENTION

1. Field of the Invention

The present invention relates generally to methods and systems for transferring data between hosts and storage devices in a virtual data storage system and, more particularly, to a method and system for allocating logical paths (i.e., physical links) between hosts and a controller in a virtual data storage system such that the loads on the logical paths are distributed evenly across the logical paths.

2. Background Art

Virtual data storage systems include a plurality of physical data storage devices for storing data provided by host processors (hosts). Hosts may later access the storage devices to obtain stored data in order to read the stored data and update the stored data. Upon updating the stored data, the hosts may access the storage devices to store the updated stored data and possibly rewrite the stored data with the updated stored data.

Typical virtual data storage systems include a relatively large number of storage devices which are made available to each host by a controller. The controller is interposed between the hosts and the storage devices and generally connects the hosts to the storage devices. Each host includes at least one logical path (i.e., physical link). Typically, the at least one physical link (i.e., link) of a host includes four links. The links of a host connect the host to the front end of the controller. A host and the controller communicate data via a link for enabling the host to store data on the storage devices and for enabling the host to read data stored on the storage devices. Each storage device includes a device path. The device path of a storage device connects the storage device to the back end of the controller. A storage device and the controller communicate data via the device path for enabling a host to store data on the storage device and for enabling a host to read data stored on the storage device.

For storage operations, the controller routes data from a host for storage on a storage device. The host communicates the data to be stored to the controller using a selected link. The controller then routes the data to a selected storage device for storage via the device path of the selected storage device. The controller selects which storage device is to store data from the host depending on the storage attributes and the current status of the storage devices. In effect, the controller connects the selected link of the host to the device path of the selected storage device in order to transfer data from the host to the selected storage device for storage operations. During a storage operation, the host is unaware as to which storage device stores the data.

For reading operations, the controller receives a request from a host for reading stored data. In response, the controller locates the storage device having the stored data. The controller then accesses the stored data from the storage device via the device path of the storage device. The controller then selects a link of the host and routes the accessed stored data to the host via the selected link. In effect, the controller connects the device path of the storage device having the stored data to the selected link of the host in order to transfer the stored data from the storage device to the host for reading operations. During a reading operation, the host is unaware as to which storage device is providing the stored data.

Typically, the controller selects a link out of a group of links of a host by selecting the first available link having no input/output activity. A problem with such a selection criteria is that some links of a host end up being more heavily used than other links of the host. When there are many input/output activities, these heavily used links will have many host contentions which will cause a relatively large number of deny connections being presented by the host to the controller. In general, the problem with such a selection criteria is that it inefficiently uses link, controller, and host resources.

SUMMARY OF THE INVENTION

Accordingly, it is an object of the present invention to provide a method and system for allocating logical paths between a host and a controller in a virtual data storage system such that the loads on the logical paths (i.e., physical links) are distributed evenly across the logical paths.

It is another object of the present invention to provide a method and system for allocating logical paths between a host and a controller in a virtual data storage system such that the loads on the logical paths are distributed uniformly across the logical paths in order to provide faster connections to the logical paths by reducing the number of host contentions.

It is a further object of the present invention to provide a method and system for allocating logical paths between a host and a controller in a virtual data storage system in which the controller includes a counter associated with a respective logical path for monitoring the number of connection requests queued on the respective logical path.

It is still another object of the present invention to provide a method and system for allocating logical paths between hosts and a controller in a virtual data storage system such that the loads on the logical paths are distributed evenly across the logical paths.

In carrying out the above objects and other objects, the present invention provides a data storage system. The system includes at least one host, a plurality of storage devices, and a controller. The host has a plurality of links. Each storage device has a respective device path. The controller has a plurality of counters. The links connect the host to the controller. The device paths connect the respective storage devices to the controller. Each counter of the controller is associated with a respective one of the links for counting or determining an amount of queued connection requests from the storage devices to the host on each one of the links. The controller selects a link for a new connection request from a storage device to the host as a function of the amount of queued connection requests on each of the links. Preferably, the controller selects the link having the lowest amount of queued connection requests to be the selected link for the new connection request.

The controller may select a link for the new connection request from a storage device to the host as a function of the amount of queued connection requests on each of the links which are void of input/output activity while the controller makes the selection.

The controller associates the new connection request with the queued connection requests on the selected link. The counter associated with the selected link increments by one when the new connection request is associated with the queued connection requests on the selected link. The counter associated with the selected link decrements by one when a queued connection request on the selected link is honored by the host.

The controller may remove links which have a maximum amount of queued connection requests from being considered as the selected link for the new connection request. The controller enables removed links to be considered as the selected link for the new connection request once the amount of queued connection requests of the removed links is lowered from the maximum amount of queued connection requests to a minium amount of queued connection requests.

Further, in carrying out the above objects and other objects, the present invention provides a method for enabling a host having a plurality of links to read data from storage devices in a data storage system. The method includes receiving a connection request for connecting a storage device to the host. An amount of queued connection requests from the storage devices to the host on each link is then counted or determined. A link for the new connection request is then selected as a function of the amount of queued connection requests on each of the links. Preferably, the link having the lowest amount of queued connection requests is selected as the selected link.

The advantages associated with the method and system of the present invention are numerous. For instance, the method and system of the present invention allow the connection requests from storage devices to a host to be distributed evenly across the links of the hosts. As a result, faster connections are provided by the links which reduce the number of host contentions.

The above objects and other objects, features, and advantages of the present invention are readily apparent from the following detailed description when taken in connection with the accompanying drawings.

DETAILED DESCRIPTION OF THE PREFERRED EMBODIMENTS

Figure 1:
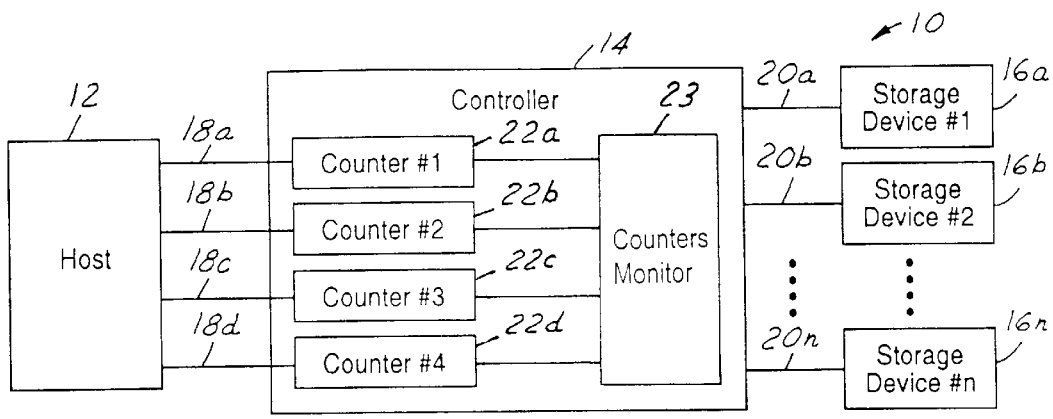
FIG. 1 illustrates a virtual data storage system in accordance with the present invention.

Referring now to FIG. 1, a virtual data storage system 10 in accordance with the present invention is shown. System 10 includes a host processor (host) 12, a controller 14, and a plurality of physical storage devices 16a, 16b, and 16n. Host 12 includes a plurality of logical paths (i.e., physical links) 18a, 18b, 18c, and 18d. Physical links (i.e., links) 18a, 18b, 18c, and 18d connect host 12 to the front side of controller 14. Each storage device 16a, 16b, and 16n includes a respective data path 20a, 20b, and 20n. Data paths 20a, 20b, and 20n connect respective storage devices 16a, 16b, and 16n to the back side of controller 14.

Host 12 communicates data with controller 14 via a link 18 in order to store data on a storage device 16 and to read data stored on a storage device. Controller 14 communicates data with storage devices 16 via associated device paths 20 in order to store data provided by host 12 and for enabling the host to read data stored on the storage devices.

In order to store data provided by host 12, controller 14 receives the data to be stored from the host via a link 18. Controller 14 then provides the data to a selected storage device 16 via the device path 20 associated with the selected storage device. In order to enable host 12 to read data stored on a storage device 16, controller 14 locates the storage device having the stored data. Controller 14 then obtains the stored data from storage device 16 via device path 20 of the storage device. Controller 14 then communicates the stored data from storage device 16 to host 12 via a selected link 18.

Controller 14 selects a link 18 from the plurality of links for communicating the stored data to host 12. For instance, controller 14 may select link 18b from the plurality of links 18a, 18b, 18c, and 18d to communicate the stored data to host 12.

In accordance with the present invention, controller 14 generally selects a link 18 from the plurality of links as a function of current input/output activity of each link and the amount of connection requests queued on each link. Controller 14 initially filters out any links 18 in the plurality of links that have a current input/output activity in progress or are disabled from being considered as the selected link. A current input/output activity of a link 18 represents data actually being transferred along the link during a current time. Controller 14 then determines the amount of connection requests queued on each of the remaining links 18 which are still candidates to be the selected link. A connection request for a link 18 represents a request for transferring data on the link from a storage device 16 to host 12 via controller 14. Controller 14 then selects the link 18 having the lowest amount of queued connection requests from the remaining available link candidates. As described above, selected link 18 generally connects host 12 to a storage device 16 via controller 14 for enabling the host to perform reading operations.

In order for controller 14 to determine the link 18 having the lowest amount of queued connection requests, the controller includes a plurality of connection work queue counters 22a, 22b, 22c, and 22d and a counters monitor 23. Counters 22a, 22b, 22c, and 22d are associated with respective links 18a, 18b, 18c, and 18d and count the amount of queued connection requests of each respective link. When a connection request is queued on a link 18, counter 22 associated with the link increments by one to reflect that an additional connection request has been entered into the queue associated with the link. When a connection request queued on a link 18 is honored by host 12, counter 22 associated with the link decrements by one to reflect that the connection request honored by host 12 has been removed from the queue associated with the link.

Monitor 23 of controller 14 monitors counters 22 to determine which available link 18 has the lowest amount of queued connection requests. Controller 14 then selects the remaining available link candidate 18 having the lowest amount of queued connection requests to be the selected link for a certain connection request.

Host 12 honors a connection request queued on selected link 18 by allowing data to be transferred via the selected link to the host. Connection requests queued on selected link 18 may include connection requests from different storage devices 16. When data associated with a connection request is being transferred via a selected link 18, the current input/output activity of the selected link is transferring the data associated with the connection request. After host 12 honors a connection request, the connection request is removed from the queue associated with selected link 18. Counter 22 associated with selected link 18 decrements by one reflecting the connection request being removed from the queue. Host 12 then honors the next connection request remaining in the queue associated with selected link 18 and the process repeats continuously.

Monitor 23 of controller 14 also monitors counters 22 to determine whether connection requests are getting queued on the links 18 at a faster rate than host 12 is honoring the connection requests. To this end, each link 18 has an associated maximum connection request threshold. For instance, the maximum connection request threshold for a link 18 may be set at 256 storage devices. This means that the queue of link 18 can have up to 256 connection requests from respective storage devices 16. Monitor 23 of controller 14 monitors counters 22 to detect whether the amount of queued connection requests on each link 18 is reaching the maximum connection request threshold. If so, controller 14 will disable any new connection requests from getting queued on each link 18 in which the amount of connection requests queued on the link is near the maximum connection request threshold.

If the amount of queued connection requests on a link 18 reaches the maximum connection request threshold, then controller 14 disables this link from becoming the selected link for a new connection request. Controller 14 prevents any new connection requests from being associated with this link until the amount of queued connection requests of the link is lowered below a connection request minimum threshold as a result of connection requests being honored by host 12. The minimum connection request threshold is lower than the maximum connection request threshold. For example, the minimum connection request threshold may be 25% lower than the maximum connection request threshold, i.e., 192 storage devices as compared to 256 storage devices.

In this manner, controller 14 may prevent any new connection requests from being queued on a link 18 once the amount of queued connection requests of the link reaches the warning connection request threshold until the amount of queued connection requests on this link is lowered to the minimum connection request threshold. In this manner, host 12 can honor queued connection requests of this link 18 to lower the amount of queued connection requests to the minimum connection request threshold before new connection requests are associated with this link, i.e., before this link may be considered as the selected link. The setting of the minimum connection request threshold for each link 18 allows the connection request backlog on a link to be reduced to a manageable value after the amount of queued connection requests reaches the maximum connection request threshold before allowing any new connection requests.

In summary, when a connection request is made for a storage device 16, a link 18 from the plurality of links is selected to accommodate the connection request. Controller 14 removes links 18 having a current input/output activity in progress or are disabled from being considered as a candidate for the selected link. Controller 14 then monitors counters 22 of the remaining link candidates 18 to determine which link has the lowest amount of queued connection requests. Controller 14 then selects the link 18 of the remaining links that has the lowest amount of queued connection requests to be the selected link. The connection request is then queued on to this selected link 18 and counter 22 associated with the selected link is incremented by one. Host 12 then honors this connection request once the previously queued connection requests of selected link 18 have been honored. Counter 22 associated with the selected link 18 decrements by one each time host 12 honors a queued connection request. If for some reason, all of links 18 have reached the maximum connection threshold, then controller 14 selects a link in a round robin manner.

Figure 2:
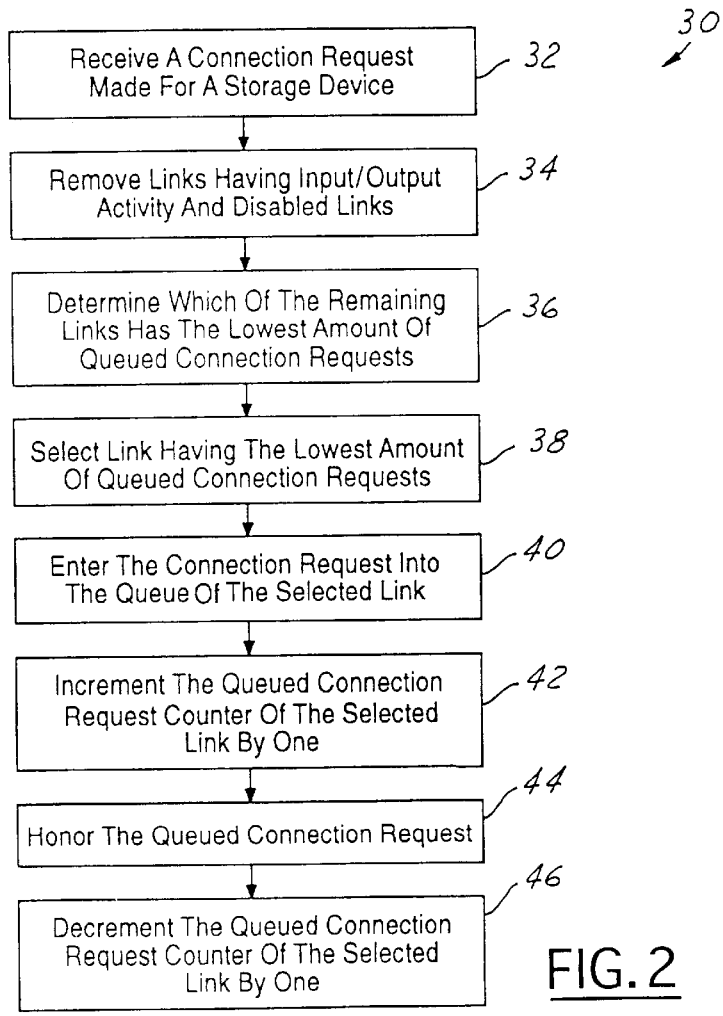
FIG. 2 illustrates a flow chart describing operation of the method and system of the present invention.

Referring now to FIG. 2, with continual reference to FIG. 1, a flow chart 30 describing operation of the method and system of the present invention is shown. Flow chart 30 beings with controller 14 receiving a connection request made for a storage device 16 as shown in block 32. The connection request represents a request to transfer stored data from storage device 16 to host 12. Controller 14 transfers the stored data from storage device to host 12 via a selected link 18. Controller 14 selects the selected link 18 out of the plurality of links connecting host 12 to the controller.

To determine which link 18 to select, controller 14 removes links 18 from the plurality of links having current input/output activity from being considered as selected link candidates as shown in block 34. Monitor 23 of controller 14 then monitors respective counters 22 associated with the remaining link candidates 18 to determine which link has the lowest amount of queued connection requests as shown in block 36. Controller 14 then selects the link 18 having the lowest amount of queued connection requests to be the selected link as shown in block 38. In sum, selected link 18 has the lowest amount of queued connection requests of the links which are not disabled and do not have current input/output activity.

The connection request is then entered into the queue of the selected link 18 as shown in block 40. Counter 22 associated with selected link 18 is then incremented by one to reflect the connection request being entered into the queue of the selected link as shown in block 42. Host 12 then honors this queued connection request of the selected link 18 as shown in block 44. Counter 22 associated with the selected link 18 then decrements by one to reflect the connection request being removed from the queue of the selected link and honored by host 12 as shown in block 46.

Figure 3:
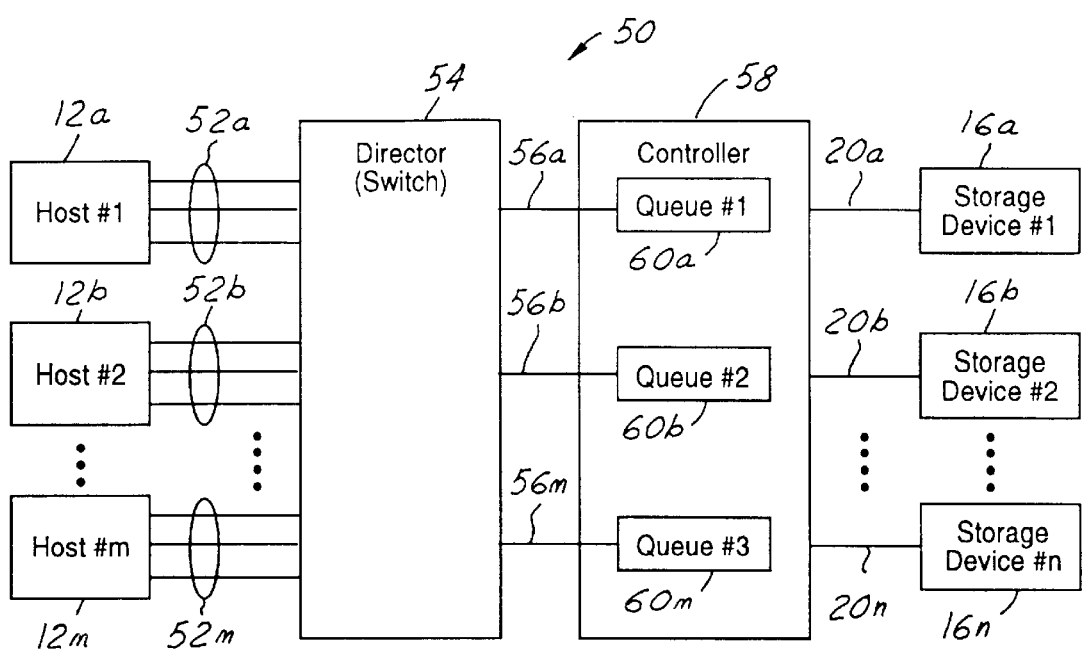
FIG. 3 illustrates a virtual data storage system in accordance with an alternative embodiment of the present invention.

Referring now to FIG. 3, a virtual data storage system 50 in accordance with an alternative embodiment of the present invention is shown. System 50 generally differs from system 10 of FIG. 1 in that system 50 is directed to a multiple host environment. To this end, system 50 includes a plurality of hosts 12a, 12b, and 12m. Each host 12 has a respective plurality of logical paths (links) 52a, 52b, and 52m. Plurality of links 52a, 52b, and 52m connect respective hosts 12a, 12b, and 12m to a director 54. Director 54 is a switch which multiplexes each plurality of links 52a, 52b, and 52m to respective single switch paths 56a, 56b, and 56m. Switch paths 56a, 56b, and 56m connect the front side of controller 58 to director 54 in order to connect hosts 12a, 12b, and 12m to the controller.

Controller 58 includes a connection request counter queue 60a, 60b, and 60m associated with each switch path 56a, 56b, and 56m and a counter monitor (not shown). Counters 60a, 60b, and 60m count the number of connection requests queued on the links of respective plurality of links 52a, 52b, and 52m. Controller 58 selects a link of a respective plurality of links 52, 52b, and 52m for accommodating a connection request to a respective host 12a, 12b, and 12m in the manner described above.

Thus it is apparent that there has been provided, in accordance with the present invention, a method and system for allocating logical paths between a host and a controller in a virtual data storage system such that the loads on the logical paths are distributed evenly across the logical paths that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A data storage system comprising:

a host having a plurality of links;

a plurality of storage devices, each storage device having a respective device path; and a controller having a plurality of counters, the controller connected to the host by the plurality of links, the controller connected to respective ones of the plurality of storage devices by the respective device paths, each counter of the plurality of counters of the controller being associated with a respective one of the plurality of links for determining an amount of queued connection requests from the plurality of storage devices to the host on each one of the plurality of links, wherein the controller selects a link from the plurality of links for a new connection request from a storage device to the host as a function of the amount of queued connection requests on each of the plurality of links, wherein the controller selects the link having the lowest amount of queued connection requests to be the selected link for the new connection request;

wherein the controller removes links of the plurality of links which have a maximum amount of queued connection requests from being considered as the selected link for the new connection request;

wherein the controller enables removed links to be considered as the selected link for the new connection request once the amount of queued connection requests of the removed links has been lowered from the maximum amount of queued connection requests to a minium amount of queued connection requests upon queued connection requests of the removed links being honored by the host.

2. The system of claim 1 wherein:

the controller selects a link from the plurality of links for the new connection request from a storage device to the host as a function of the amount of queued connection requests on each of the plurality of links which are void of input/output activity while the controller makes the selection.

3. The system of claim 1 wherein:

the controller associates the new connection request with the queued connection requests on the selected link.

4. The system of claim 3 wherein:

the counter associated with the selected link increments by one when the new connection request is associated with the queued connection requests on the selected link.

5. The system of claim 3 wherein:

the counter associated with the selected link decrements by one when a queued connection request on the selected link is honored by the host.

6. The system of claim 1 wherein:

the controller removes links of the plurality of links which have input/output activity from being considered as the selected link for the new connection request.

7. The system of claim 1 wherein:

the host includes a plurality of hosts, each host of the plurality of hosts having a plurality of links for connecting the hosts to the controller.

8. A method for enabling a host having a plurality of links to read data from storage devices in a data storage system, the host being connected to a controller by the plurality of links and the storage devices being connected to the controller by respective device paths, the method comprising:

receiving a connection request for connecting a storage device to the host;

determining an amount of queued connection requests from the storage devices to the host on each link of the plurality of links;

selecting a link from the plurality of links for a new connection request from a storage device to the host as a function of the amount of queued connection requests on each of the plurality of links, wherein selecting includes selecting the link having the lowest amount of queued connection requests to be the selected link for the new connection request;

removing links of the plurality of links which have a maximum amount of queued connection requests from being considered as the selected link for the new connection request; and enabling removed links to be considered as the selected link for the new connection request once the amount of queued connection requests of the removed links has been lowered from the maximum amount of queued connection requests to a minium amount of queued connection requests upon queued connection requests of the removed links being honored by the host.

9. The method of claim 8 wherein:

selecting a link from the plurality of links for the new connection request includes selecting the link as a function of the amount of queued connection requests on each of the plurality of links which are void of input/output activity during the selection.

10. The method of claim 8 further comprising:

associating the new connection request with the queued connection requests on the selected link.

11. The method of claim 10 further comprising:

incrementing by one the amount of queued connection requests on the selected link after associating the new connection request with the queued connection requests of the selected link.

12. The method of claim 10 further comprising:

decreasing by one the amount of queued connection requests on the selected link after a queued connection request on the selected link is honored by the host.

* * * * *